United States Patent
Uehara et al.

(10) Patent No.: US 11,333,204 B2
(45) Date of Patent: May 17, 2022

(54) WET FRICTION PLATE AND WET MULTIPLE DISC CLUTCH DEVICE PROVIDED WITH WET FRICTION PLATE

(71) Applicant: Kabushiki Kaisha F.C.C., Hamamatsu (JP)

(72) Inventors: Kazuya Uehara, Shizuoka (JP);
Masatoshi Miyagawa, Shizuoka (JP);
Nobuyuki Katayama, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/058,160

(22) PCT Filed: May 24, 2019

(86) PCT No.: PCT/JP2019/020592
§ 371 (c)(1),
(2) Date: Nov. 24, 2020

(87) PCT Pub. No.: WO2019/230581
PCT Pub. Date: Dec. 5, 2019

(65) Prior Publication Data
US 2021/0215205 A1   Jul. 15, 2021

(30) Foreign Application Priority Data
May 31, 2018  (JP) .............................. JP2018-104412

(51) Int. Cl.
*F16D 13/74* (2006.01)
*F16D 13/72* (2006.01)
(Continued)

(52) U.S. Cl.
CPC .............. *F16D 13/74* (2013.01); *F16D 13/52* (2013.01); *F16D 13/648* (2013.01); *F16D 13/72* (2013.01);
(Continued)

(58) Field of Classification Search
CPC . F16D 2069/004–008; F16D 13/72–74; F16D 69/00–02; F16D 69/0408; F16D 13/64–648
See application file for complete search history.

(56) References Cited

U.S. PATENT DOCUMENTS

| 5,094,331 | A |   | 3/1992 | Fujimoto et al. |
| 6,105,234 | A | * | 8/2000 | Kremsmair ........... B22F 3/1109 188/218 XL |

(Continued)

FOREIGN PATENT DOCUMENTS

| JP | 61-149630 A | 7/1986 |
| JP | 63-288299 A | 11/1988 |

(Continued)

OTHER PUBLICATIONS

International Search Report (ISR) dated Aug. 6, 2019 filed in PCT/JP2019/020592.
(Continued)

*Primary Examiner* — Ernesto A Suarez
*Assistant Examiner* — Lillian T Nguyen
(74) *Attorney, Agent, or Firm* — Rankin, Hill & Clark LLP (57) ABSTRACT

Provided are a wet friction plate and a wet multiplate clutch device including the wet friction plates capable of improving the performance for discharging lubricant oil adhering to surfaces of friction members. A wet friction plate includes oil grooves and friction members on a flat plate annular core metal. At a surface of a porous layer of the friction member, a friction slide surface and lubricant oil recessed portions are formed. The lubricant oil recessed portion has no sharp portion in a pointed shape, such as a corner portion, and is formed with a smooth continuous surface. The multiple lubricant oil recessed portions depressed in a recessed shape with respect to the friction slide surface are formed. In the (Continued)

porous layer, hollow portions are formed to have the same formation rate between a portion forming the friction slide surface and a portion forming the lubricant oil recessed portion.

5 Claims, 7 Drawing Sheets

(51) Int. Cl.
  *F16D 69/00* (2006.01)
  *F16D 13/52* (2006.01)
  *F16D 13/64* (2006.01)

(52) U.S. Cl.
  CPC ........ *F16D 69/00* (2013.01); *F16D 2069/004* (2013.01)

(56) References Cited

U.S. PATENT DOCUMENTS

| | | | |
|---|---|---|---|
| 2008/0006504 A1 | 1/2008 | Sudau et al. | |
| 2014/0110199 A1* | 4/2014 | Tokumasu | F16D 55/40 188/218 XL |
| 2016/0281810 A1* | 9/2016 | Terauchi | B32B 27/06 |

FOREIGN PATENT DOCUMENTS

| | | |
|---|---|---|
| JP | 1-146018 U | 10/1989 |
| JP | 2000-73299 A | 3/2000 |
| JP | 2004-211781 A | 7/2004 |
| JP | 2007-263203 A | 10/2007 |
| JP | 2008-14493 A | 1/2008 |

OTHER PUBLICATIONS

Japanese Office Action (JPOA) dated Nov. 5, 2019 issued in the corresponding Japanese Patent Application No. 2018-104412.
Decision to Grant dated Feb. 4, 2020 issued in the corresponding Japanese Patent Application No. 2018-104412.

* cited by examiner

WET FRICTION PLATE AND WET MULTIPLE DISC CLUTCH DEVICE PROVIDED WITH WET FRICTION PLATE

TECHNICAL FIELD

The present invention relates to a wet friction plate used in lubricant oil. Specifically, the present invention relates to a wet friction plate suitable for a wet multiplate clutch device arranged between a motor and a drive target to be rotatably driven by the motor to transmit drive force of the motor to the drive target or block such transmission. Moreover, the present invention relates to a wet multiplate clutch device including the wet friction plates.

BACKGROUND ART

Typically, on a vehicle such as a four-wheeled vehicle or a two-wheeled vehicle, a wet multiplate clutch device is mounted for transmitting rotary drive force of a motor such as an engine to a drive target such as a wheel or block such transmission. Generally, the wet multiplate clutch device transmits the rotary drive force or blocks such transmission in such a manner that two plates arranged facing each other in lubricant oil are pressed against each other.

In this case, one of two plates includes a wet friction plate having a friction member provided along a circumferential direction on a surface of a flat plate annular core metal. For example, Patent Literature 1 below discloses a wet friction member (hereinafter referred to as a "wet friction plate") having a papermaking groove (hereinafter referred to as a "lubricant oil recessed portion") depressed in a recessed shape and formed at a surface of a friction member. With this configuration, in the wet friction plate, lubricant oil adhering to a surface of the wet friction plate is easily discharged. Thus, drag torque can be reduced.

CITATION LIST

Patent Literature

PATENT LITERATURE 1: JP-A-2007-263203

However, in the wet friction plate described in Patent Literature 1, a support layer of the lubricant oil recessed portion into which the lubricant oil enters is compressed and deformed by pressing or cutting for forming the lubricant oil recessed portion. Thus, tendency shows that lubricant oil discharge performance is degraded. For this reason, in the typical wet friction plate, specifically in a case where the lubricant oil is at a low temperature or a case where the pressure of contact between the wet friction plate and a clutch plate is low, a problem that it is difficult to discharge the lubricant oil is caused.

The present invention copes with the above-described problem. An object of the present invention is to provide a wet friction plate capable of improving the performance for discharging lubricant oil adhering to a surface of a friction member and a wet multiplate clutch device including the wet friction plates.

SUMMARY OF INVENTION

In order to achieve the object described above, a feature of the present invention is a wet friction plate which includes: a friction member including a friction slide surface and multiple lubricant oil recessed portions depressed in a recessed shape with respect to the friction slide surface, the friction slide surface and the lubricant oil recessed portions being formed at a surface of a porous layer having multiple hollow portions; and a core metal formed in a flat plate annular shape and provided with the friction member along a circumferential direction. The friction member is configured such that a surface of each lubricant oil recessed portion has no sharp portion in a pointed shape, such as a corner portion, and formed with a smooth continuous surface and a formation rate of the hollow portions in the porous layer forming the lubricant oil recessed portions and a formation rate of the hollow portions in the porous layer forming the friction slide surface are identical to each other.

According to the feature of the present invention having such a configuration, a wet friction plate has no sharp portions in a pointed shape, such as corner portions, at the surfaces of the lubricant oil recessed portions. That is, the surface of the lubricant oil recessed portion is formed with the smooth continuous surface. In addition, the porous layer forming the lubricant oil recessed portion and the porous layer forming the friction slide surface are formed to have the same formation rate of the hollow portion. Thus, lubricant oil penetration and discharge performance of the porous layer is the same between the friction slide surface and the lubricant oil recessed portion. Thus, the performance for discharging lubricant oil adhering to a surface of the friction member can be improved.

Note that the same formation rate of the hollow portion between the porous layer forming the lubricant oil recessed portion and the porous layer forming the friction slide surface does not mean only perfect match of the formation rate of the hollow portion between these layers. A case where a difference in the formation rate of the hollow portion between the layers falls within such a range (e.g., a difference of equal to or less than ±10%) that a difference in the lubricant oil penetration and discharge performance between the layers falls within a predetermined range (e.g., a difference of equal to or less than ±10%) taken as the substantially same penetration and discharge performance is also included in the same formation rate of the hollow portion. Moreover, the smooth continuous surface forming the surface of the lubricant oil recessed portion may be a lubricant oil recessed portion surface including an inclined surface having a linearly-extending flat surface. Note that the surface of the lubricant oil recessed portion preferably includes the curved surface depressed in the recessed shape.

Further, another feature of the present invention is that each lubricant oil recessed portion is configured such that at least one of two sections in directions perpendicular to each other as viewed in plane is formed in an arc shape with one curvature.

According to another feature of the present invention having such a configuration, in the wet friction plate, the lubricant oil recessed portion is formed such that the section along at least one of two directions perpendicular to each other as viewed in plane has the arc shape with one curvature. Thus, the lubricant oil recessed portion can be easily formed.

Further, still another feature of the present invention is that, in the wet friction plate, each lubricant oil recessed portion is formed in a long hole shape or an oval shape as viewed in plane.

According to still another feature of the present invention having such a configuration, in the wet friction plate, the lubricant oil recessed portion is formed in the bottomed long hole shape or oval shape as viewed in plane. Thus, the lubricant oil recessed portion can be formed while a necessary friction contact area can be ensured without locally causing a great missing portion of the friction slide surface at the friction slide surface.

Further, still another feature of the present invention is that, in the wet friction plate, each lubricant oil recessed portion is formed to linearly extend, and adjacent ones of the lubricant oil recessed portions are formed in directions perpendicular to each other.

According to still another feature of the present invention having such a configuration, the wet friction plate is formed such that the lubricant oil recessed portion linearly extends. In addition, adjacent ones of the lubricant oil recessed portions are formed in the directions perpendicular to each other. Thus, weakening of the durability of the friction member in a specific direction can be prevented, and uniform durability can be ensured. Moreover, the lubricant oil recessed portions are formed in directions crossing a rotary drive direction of the wet friction plate. This can improve friction resistance. In addition, the lubricant oil recessed portion is formed to extend outwardly in a radial direction of the wet friction plate. Thus, the lubricant oil discharge performance by the centrifugal force can be ensured.

Still another feature of the present invention is that in the wet friction plate, the lubricant oil recessed portions are formed with multiple types of depths.

According to still another feature of the present invention having such a configuration, in the wet friction plate, the lubricant oil recessed portions are formed with the multiple types of depths. Thus, in a case where abrasion of the friction member is accelerated and the entire thickness of the friction member decreases, the lubricant oil recessed portions with small depths are brought into a state close to disappearance. Thus, degradation of the durability of the friction member can be reduced. In this case, a similar advantageous effect can be expected in such a manner that the lubricant oil recessed portions of the wet friction plate are formed with multiple types of groove widths instead of or in addition to formation of the lubricant oil recessed portions with the multiple types of depths.

The present invention can be implemented not only as the invention relating to the wet friction plate, but also can be implemented as the invention relating to a wet multiplate clutch including the wet friction plates and the method for manufacturing the wet friction plate.

Specifically, it is preferred that a wet multiplate clutch device includes: an opposing plate arranged facing a drive plate to be rotatably driven by a motor through a clearance and lubricant oil. It is also preferred that the opposing plate and the drive plate contact each other or separate from each other to transmit rotary drive force between the opposing plate and the drive plate or block transmission of the rotary drive force, and at least one of the drive plate or the opposing plate is the wet friction plate according to any one of claims 1 to 5. It can be expected that he wet multiplate clutch device having such a configuration provides features and advantageous effects similar to those of the wet friction plate.

The method for manufacturing the wet friction plate is the method for manufacturing a wet friction plate including a friction member having a friction slide surface and multiple lubricant oil recessed portions depressed in a recessed shape with respect to the friction slide surface, the friction slide surface and the lubricant oil recessed portions being formed at a surface of a porous layer having multiple hollow portions, and a core metal formed in a flat plate annular shape and provided with the friction member along a circumferential direction. This method may include the original shape formation step of forming, in a sheet shape, the slurry of a raw material including a fibrous material forming the porous layer, the water content adjustment step of reducing the water content of the sheet-shaped raw material to equal to or lower than 90% and equal to or higher than 50%, the lubricant oil recessed portion formation step of pressing a lubricant oil recessed portion molding die with a surface as a smooth continuous surface with no sharp portions in a pointed shape, such as corner portions, against the sheet-shaped raw material having the adjusted water content to form the lubricant oil recessed portions, and the drying step of reducing the water content of the sheet-shaped raw material having the formed lubricant oil recessed portions to equal to or lower than 10%. According to the wet friction plate manufacturing method having such a configuration, the wet friction plate can be manufactured.

DESCRIPTION OF EMBODIMENTS

Figure 1:
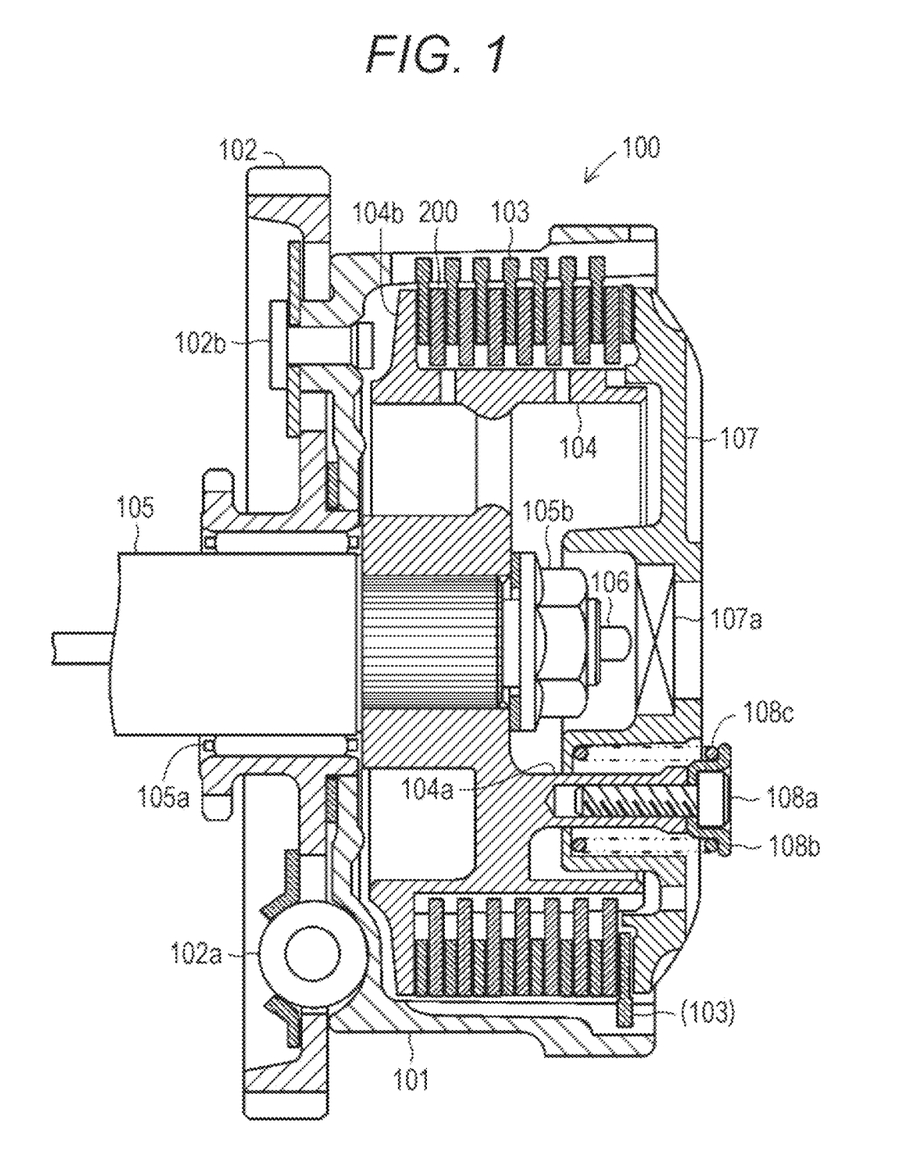
FIG. 1 is a sectional view of an entire configuration of a wet multiplate clutch device including wet friction plates according to one embodiment of the present invention.

Hereinafter, one embodiment of a wet friction plate, a wet multiplate clutch device including the wet friction plates, and the method for manufacturing the wet friction plate according to the present invention will be described with reference to the drawings. FIG. 1 is a schematic sectional view of an entire configuration of a wet multiplate clutch device 100 including wet friction plates 200 according to the present invention. Note that for the sake of easy understanding of the present invention, each figure as a reference in the present specification schematically illustrates the configuration of the invention by, e.g., exaggerating some components. Thus, in some cases, the dimensions of each component, a ratio between components or the like in the figures might be different from actual dimensions, ratios or the like. The wet multiplate clutch device 100 is a mechanical device configured to transmit drive force of an engine (not shown) as a motor of a two-wheeled vehicle (a motorcycle) to a wheel (not shown) as a drive target or block such transmission. The wet multiplate clutch device 100 is arranged between the engine and a transmission (not shown).

(Configuration of Wet Multiplate Clutch Device 100)

The wet multiplate clutch device 100 includes an aluminum alloy housing 101. The housing 101 is a member formed in a bottomed cylindrical shape and forming part of a housing of the wet multiplate clutch device 100. An input gear 102 is, with a rivet 102b, fixed to a left side surface of the housing 101 as viewed in the figure through a torque damper 102a. The input gear 102 is rotatably driven by engaging with a not-shown drive gear to be rotatably driven by drive of the engine. On an inner peripheral surface of the housing 101, each of multiple (eight in the present embodiment) clutch plates 103 is, by spline fitting, held along an axial direction of the housing 101 in a state in which clutch plates 103 are displaceable and rotatable integrally with the housing 101.

The clutch plate 103 is a flat plate annular component to be pressed against the later-described wet friction plate 200. The clutch plate 103 is formed in such a manner that a thin plate member made of a SPCC (cold-rolled steel plate) material is punched in an annular shape. A later-described not-shown oil groove having a depth of several μm to several tens of μm for holding lubricant oil is formed at each side surface (front and back surfaces) of the clutch plate 103. For the purpose of improving abrasion resistance, surface hardening treatment is performed for each side surface (the front and back surfaces) of the clutch plate 103 at which the oil groove is formed. Note that such surface hardening treatment does not directly relate to the present invention, and therefore, description thereof will be omitted.

A friction plate holder 104 formed in a substantially cylindrical shape and provided concentrically with the housing 101 is arranged inside the housing 101. At an inner peripheral surface of the friction plate holder 104, many spline grooves are formed along an axial direction of the friction plate holder 104. A shaft 105 is spline-fitted in the spline grooves. The shaft 105 is a shaft body formed in a hollow shape, and one (the right side as viewed in the figure) end portion thereof rotatably supports the input gear 102 and the housing 101 through a needle bearing 105a. In addition, the shaft 105 supports the spline-fitted friction plate holder 104 in a fixed manner through a nut 105b. That is, the friction plate holder 104 rotates integrally with the shaft 105. On the other hand, the other (the left side as viewed in the figure) end portion of the shaft 105 is coupled to the not-shown transmission of the two-wheeled vehicle.

A shaft-shaped push rod 106 is arranged in a hollow portion of the shaft 105. The push rod 106 penetrates the hollow portion of the shaft 105 to protrude from one (the right side as viewed in the figure) end portion of the shaft 105. The side (the left side as viewed in the figure) of the push rod 106 opposite to the end portion protruding from one (the right side as viewed in the figure) end portion of the shaft 105 is coupled to a not-shown clutch operation lever of the two-wheeled vehicle. By operation of the clutch operation lever, the push rod 106 slides in the hollow portion of the shaft 105 along an axial direction of the shaft 105.

On an outer peripheral surface of the friction plate holder 104, adjacent ones of the multiple (seven in the present embodiment) wet friction plates 200 sandwich the clutch plate 103. The wet friction plate 200 is, by spline fitting, held along the axial direction of the friction plate holder 104 in a state in which the wet friction plate 200 is displaceable and rotatable integrally with the friction plate holder 104.

The inside of the friction plate holder 104 is filled with a predetermined amount of lubricant oil (not shown). In addition, each of three tubular support rods 104a is formed inside the friction plate holder 104 (the figure illustrates only one). The lubricant oil is supplied to among the wet friction plates 200 and the clutch plates 103. With this configuration, absorption of friction heat generated among the wet friction plates 200 and the clutch plates 103 and abrasion of friction members 210 are prevented.

Each of three tubular support rods 104a is formed to protrude outwardly (the right side as viewed in the figure) in the axial direction of the friction plate holder 104. A pressing cover 107 arranged at a position concentric with the friction plate holder 104 is assembled with the tubular support rods 104a through a bolt 108a, a receiving plate 108b, and a coil spring 108c. The pressing cover 107 is formed in a substantially discoid plate having the substantially same outer diameter as the outer diameter of the wet friction plate 200, and is pressed toward a friction plate holder 104 side by the coil spring 108c. A release bearing 107a is provided at a position facing a right tip end portion of the push rod 106 as viewed in the figure at a center portion inside the pressing cover 107.

(Configuration of Wet Friction Plate 200)

Figure 2:
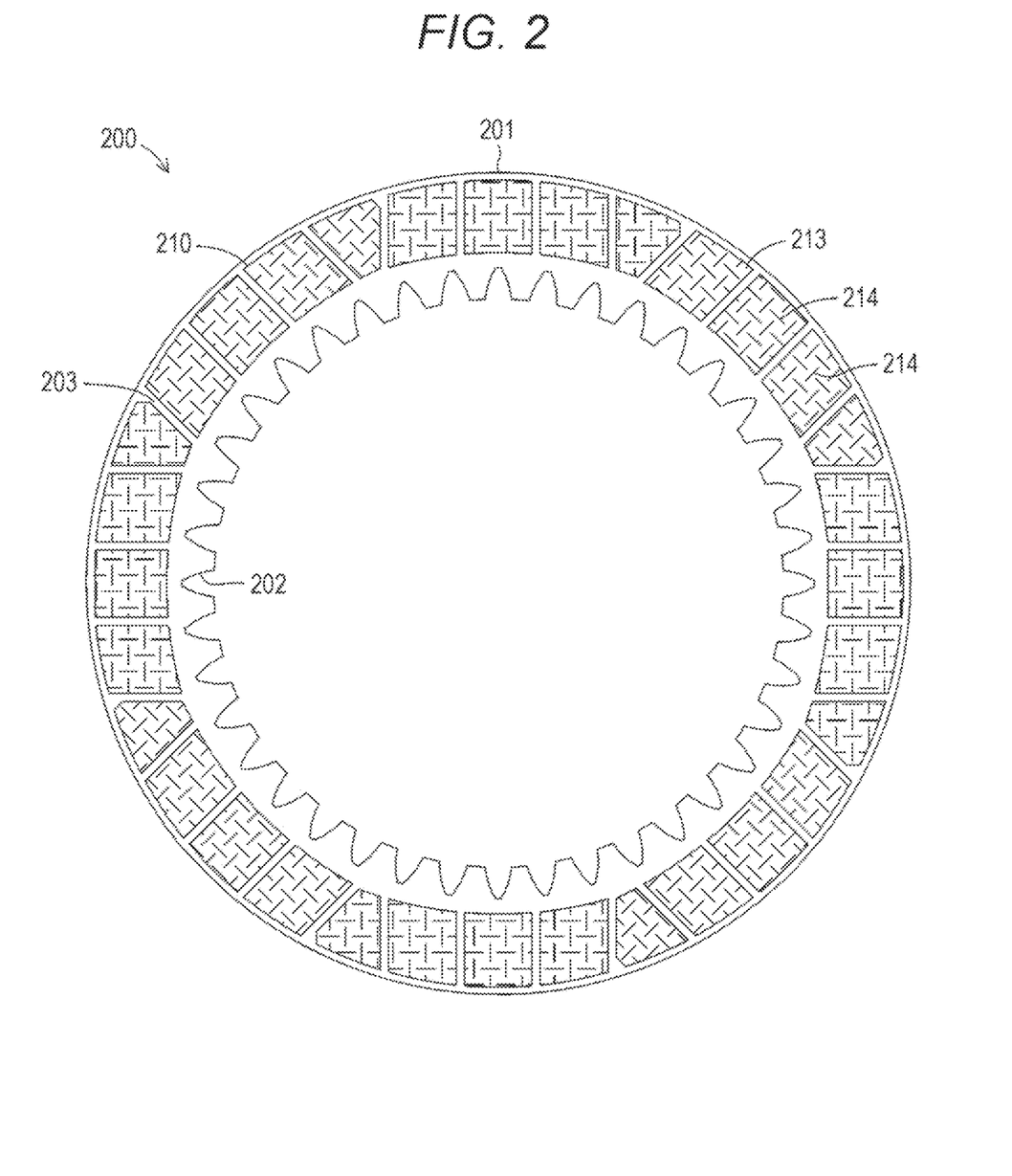
FIG. 2 is a schematic plan view of an outer appearance of the wet friction plate according to one embodiment of the present invention, the wet friction plate being assembled in the wet multiplate clutch device illustrated in FIG. 1.

Specifically, as illustrated in FIG. 2, the wet friction plate 200 includes oil grooves 203 and the friction members 210 provided on a flat plate annular core metal 201. The core metal 201 is a member as a base portion of the wet friction plate 200. The core metal 201 is formed in such a manner that a thin plate member made of a SPCC (cold-rolled steel plate) material is punched in a substantially annular shape. In this case, an internal-tooth spline 202 is formed at an inner peripheral portion of the core metal 201 such that the core metal 201 is spline-fitted to the friction plate holder 104.

At a side surface of the wet friction plate 200 facing the clutch plate 103, i.e., a side surface of the core metal 201 facing the clutch plate 103, the multiple (32 in the present embodiment) small piece-shaped friction members 210 are provided along a circumferential direction of the core metal 201 through the oil grooves 203 forming clearances.

The oil groove 203 is a flow path configured to guide the lubricant oil between an inner peripheral edge and an outer peripheral edge of the core metal 201 of the wet friction plate 200. In addition, the oil groove 203 is also an oil holding portion configured to hold the lubricant oil between the wet friction plate 200 and the clutch plate 103. Each oil groove 203 is formed to linearly extend between adjacent ones of the multiple small piece-shaped friction members 210.

Figure 3:
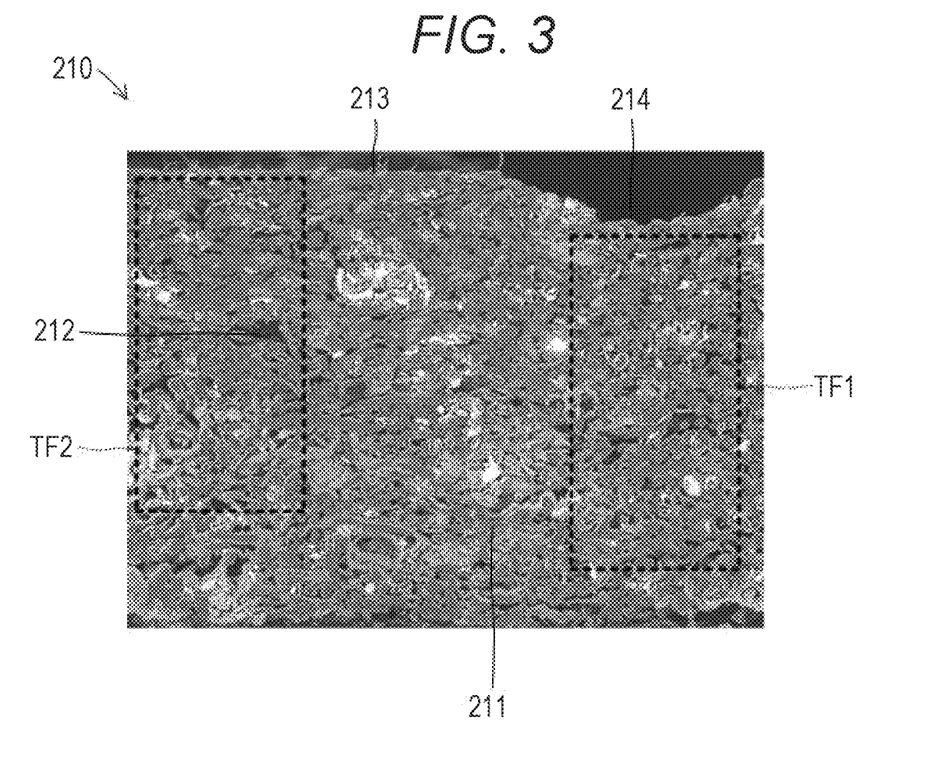
FIG. 3 is image data obtained in such a manner that an image of the cross section of a friction member forming the wet friction plate illustrated in FIG. 2 is captured by a scanning electron microscope.

The friction member 210 improves friction force for the clutch plate 103. The friction member 210 is made of a small piece-shaped paper material bonded along the circumferential direction of the core metal 201. As illustrated in FIG. 3, the friction member 210 includes a hard porous layer 211. The porous layer 211 is obtained in such a manner that thermosetting resin with which a paper base material is impregnated is hardened.

In this case, the paper base material includes a filler added to at least one of organic fibers or inorganic fibers. The organic fibers may be made of one or more types of fibers such as wood pulp, synthetic pulp, polyester-based fibers, polyamide-based fibers, polyimide-based fibers, modified polyvinyl alcohol fibers, polyvinyl chloride fibers, polypropylene fibers, polybenzimidazole fibers, acrylic fibers, carbon fibers, phenol fibers, nylon fibers, and cellulose fibers. Moreover, the inorganic fibers may be made of one or more types of fibers such as glass fibers, rock wool, potassium titanate fibers, ceramic fibers, silica fibers, silica-alumina fibers, kaolin fibers, bauxite fibers, kayanoid fibers, boron fibers, magnesia fibers, and metal fibers.

Moreover, the filler fulfills a function as a friction modifier and/or a solid lubricant. Such a filler may be made of one or more types of materials such as barium sulfate, calcium carbonate, magnesium carbonate, silicon carbide, boron carbide, titanium carbide, silicon nitride, boron nitride, alumina, silica, zirconia, cashew dust, rubber dust, diatom earth, graphite, talc, kaolin, magnesium oxide, molybdenum disulfide, nitrile rubber, acrylonitrile-butadiene rubber, styrene-butadiene rubber, silicon rubber, and fluorine-containing rubber. Further, examples of the thermosetting resin include phenol-based resin, melamine resin, epoxy resin, urea resin, and silicone resin.

A number of hollow portions 212 are formed at the porous layer 211. The hollow portions 212 are pore portions formed in clearances among the materials including the paper base material and the thermosetting resin. Neither the paper base material nor the thermosetting resin is present in the pore portions. The lubricant oil adhering to surfaces of the friction members 210 penetrates and flows in the pore portions, or is held in the pore portions. Many hollow portions 212 with various sizes are randomly formed inside the porous layer 211. In this case, the hollow portions 212 include hollow portions 212 opening at a surface of the porous layer 211 and hollow portions 212 formed inside the porous layer 211 without opening at the surface of the porous layer 211. Moreover, the hollow portions 212 include adjacent hollow portions 212 communicated with each other and adjacent hollow portions 212 not communicated with each other.

Figure 4:
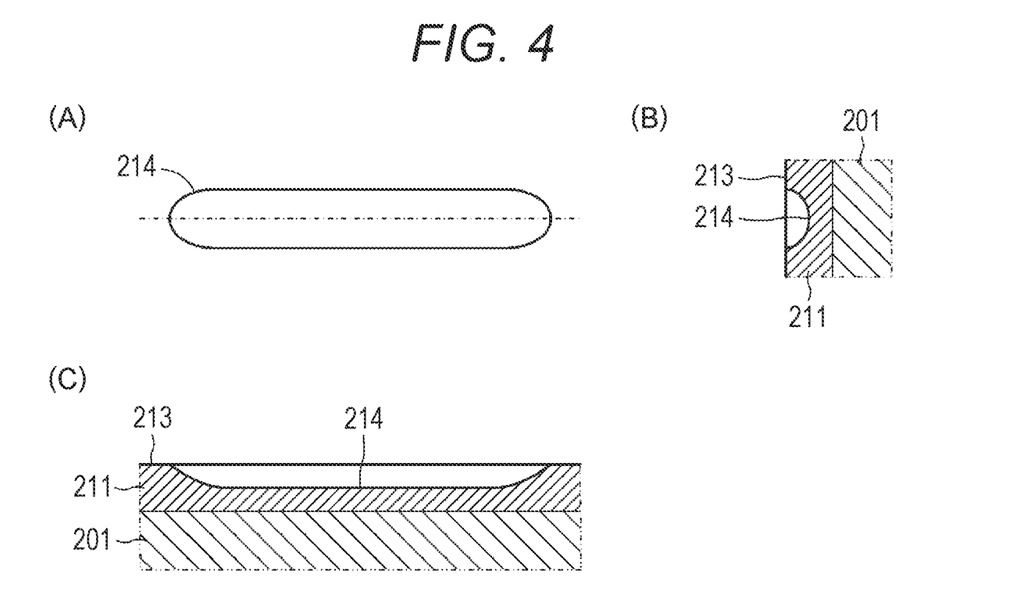
FIGS. 4(A) to 4(C) schematically illustrate the lubricant oil recessed portion at the friction member forming the wet friction plate illustrated in FIG. 2, FIG. 4(A) being a plan view of the lubricant oil recessed portion, FIG. 4(B) being a cross-sectional view of the lubricant oil recessed portion, and FIG. 4(C) being a longitudinal sectional view of the lubricant oil recessed portion.

As illustrated in each of FIGS. 4(A) to 4(C), a friction slide surface 213 and lubricant oil recessed portions 214 are formed at the surface of the porous layer 211. The friction slide surface 213 is a portion configured to friction-slide in contact with the clutch plate 103. The friction slide surface 213 includes a flat surface. The lubricant oil recessed portion 214 is a portion configured to increase the friction resistance of the friction member 210 and hold the lubricant oil. The multiple lubricant oil recessed portions 214 are depressed in a recessed shape with respect to the friction slide surface 213. In this case, the recessed surface of each lubricant oil recessed portion 214 has no sharp portions in a pointed shape, such as corner portions. That is, the recessed surface of the lubricant oil recessed portion 214 is formed with a smooth continuous surface.

In the present embodiment, each lubricant oil recessed portion 214 is formed in a long hole shape as viewed in plane. More specifically, the lubricant oil recessed portion 214 is formed in such a shape that in a longitudinal sectional shape along a longitudinal direction of the lubricant oil recessed portion 214, a deepest portion of the recessed portion linearly extends in the horizontal direction and both end portions of the deepest portion gently curve toward the friction slide surface 213 and incline in a curved shape. Moreover, the lubricant oil recessed portion 214 is formed with an arc cross-sectional shape along a width direction perpendicular to the longitudinal direction. In this case, the lubricant oil recessed portions 214 include lubricant oil recessed portions 214 formed with multiple types of sizes including multiple types of lengths in the longitudinal direction, lengths in the width direction, and depths of the deepest portion. In the present embodiment, the lubricant oil recessed portions 214 are formed as lubricant oil recessed portions with multiple types of sizes of about 1.0 to 2.0 mm in the longitudinal direction, about 0.6 to 0.7 mm in the width direction, and 0.25 to 0.4 mm in depth.

Of these lubricant oil recessed portions 214, adjacent lubricant oil recessed portions 214 are formed to extend in directions perpendicular to each other through the friction slide surface 213. Of the lubricant oil recessed portions 214 adjacent to each other in the longitudinal direction and the width direction, one lubricant oil recessed portion 214 is formed to extend in a direction perpendicular to an adjacent lubricant oil recessed portion 214 in the present embodiment. That is, in the present embodiment, the lubricant oil recessed portions 214 are formed in a mesh shape across the entire surface of the friction slide surface 213 as viewed in plane.

At the porous layer 211, the hollow portions 212 are formed with the same formation rate between the portion forming the friction slide surface 213 and the portion forming the lubricant oil recessed portion 214. The formation rate of the hollow portion 212 as described herein is the rate of the hollow portion 212 in a certain space in the porous layer 211. The formation rate of the hollow portion 212 can be calculated from the amount of fluid injected into the porous layer 211 by pressure injection, such as oil, mercury, or helium. Alternatively, the formation rate of the hollow portion 212 can be approximately calculated by image processing using a digital image obtained by imaging of the porous layer 211. Specifically, the formation rate of the hollow portion 212 can be calculated by the image processing of binarizing images acquired by imaging of each section of the porous layer 211 right below the friction slide surface 213 and the porous layer 211 right below the lubricant oil recessed portion 214.

First, a worker cuts the lubricant oil recessed portion 214 of the friction member 210 in a cross-sectional direction. Thereafter, digital image data (hereinafter merely referred to as "image data") is acquired in such a manner that the state of the cross section is imaged with a predetermined magnification (e.g., ×120) by means of a magnification imaging device such as a scanning electron microscope (see FIG. 3).

In this case, the worker captures a state image including the section of the friction slide surface 213 formed around the lubricant oil recessed portion 214 targeted for imaging.

Next, the worker performs, using a computer device capable of processing the image data, such as a personal computer, trimming for image data of a portion right below the lubricant oil recessed portion 214 and image data of a portion right below the friction slide surface 213 in the acquired image data within trimming frames TF1, TF2 with predetermined sizes. In this case, the trimming frame TF1 defining the trimming area of the image data of the portion right below the lubricant oil recessed portion 214 can be formed in a quadrangular shape as a whole. This shape has a length of at least equal to or greater than ⅓ of the width of the lubricant oil recessed portion 214 with respect to the center position of the portion right below the lubricant oil recessed portion 214 in the width direction thereof and a length of at least equal to or greater than 70% of the thickness of the porous layer 211 right below the lubricant oil recessed portion 214.

The trimming frame TF2 defining the trimming area of the image data of the portion right below the friction slide surface 213 is formed to have the same size as that of the trimming frame TF1. In addition, the trimming frame TF2 is arranged sufficiently apart from the lubricant oil recessed portion 214 at the portion right below the friction slide surface 213. In this case, the trimming frames TF1, TF2 are arranged at positions close to each surface of the lubricant oil recessed portion 214 and the friction slide surface 213. Note that in the present embodiment, the trimming frame TF1, TF2 is formed with 330 pixels×660 pixels.

Figure 5:
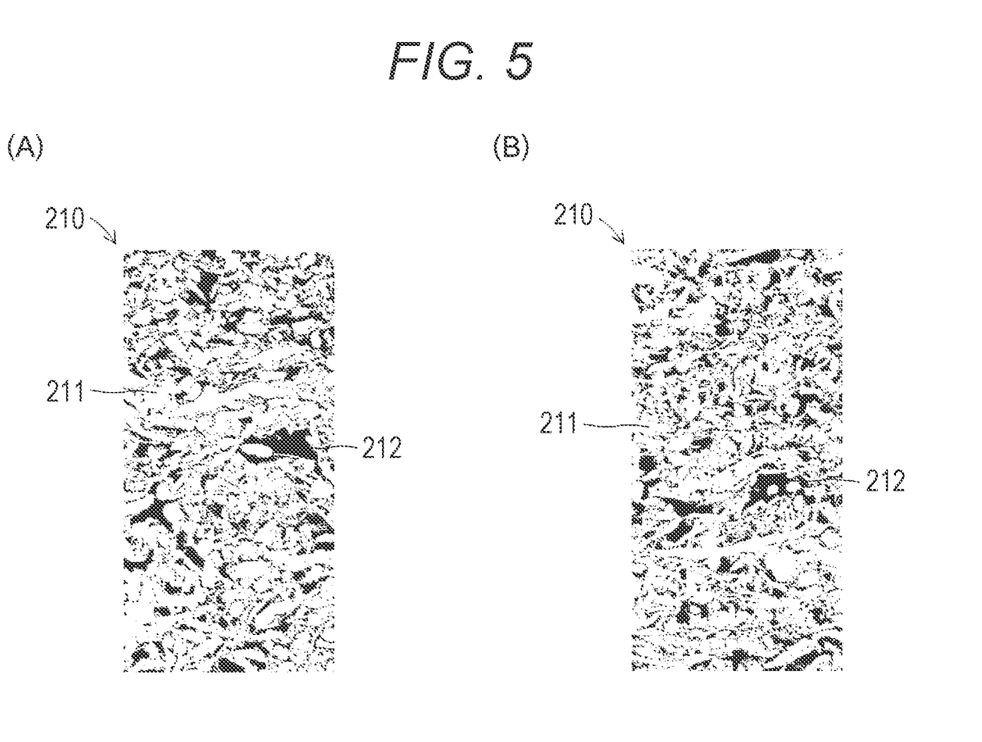
FIGS. 5(A) and 5(B) are image data obtained in such a manner that image data trimmed from the image data illustrated in FIG. 3 within trimming frames TF1, TF2 is binarized, FIG. 5(A) illustrating a porous layer right below a friction slide surface and FIG. 5(B) illustrating a porous layer right below the lubricant oil recessed portion.

Next, as illustrated in each of FIGS. 5(A) and 5(B), the worker binarizes two pieces of image data trimmed within the trimming frames TF1, TF2 by means of image processing software (a well-known computer program) capable of binarizing the image data. In this case, a threshold for accurately converting image data of the hollow portion 212 in the image data into the black or the white is set to the image processing software. With this configuration, the worker can acquire the binarized image data of the portion right below the lubricant oil recessed portion 214 and the binarized image data of the portion right below the friction slide surface 213. In the present embodiment, the hollow portion 212 is converted into the black. In addition, the porous layer 211 other than the hollow portions 212 is converted into the white.

Next, the worker calculates, using image processing software (a well-known computer program) capable of calculating each area of the black portion and the white portion in the binarized image data, the cumulative total of the area of the portion (the black portion) equivalent to the hollow portions 212 in the binarized image data. Such total calculation is performed for each trimming frame TF1, TF2.

In this manner, when a difference between the total area of the hollow portions 212 within the trimming frame TF1 on the image data and the total area of the hollow portions 212 within the trimming frame TF2 on the image data falls within a predetermined range, the worker determines that the formation rate of the hollow portion 212 is the same between these portions. The difference falling within the predetermined range as described herein preferably means that a difference between both totals is equal to or less than a range of ±10%. Note that the worker can also check the identicalness of the formation rate by comparison of the rate of the total area of the hollow portions 212 to the total area of the trimming frame TF1 or the rate of the total area of the hollow portions 212 to the total area of the porous layer 211 (the white portion) excluding the hollow portions 212 within the trimming frame TF1 with a similar total area rate in the trimming frame TF2.

Figure 6:
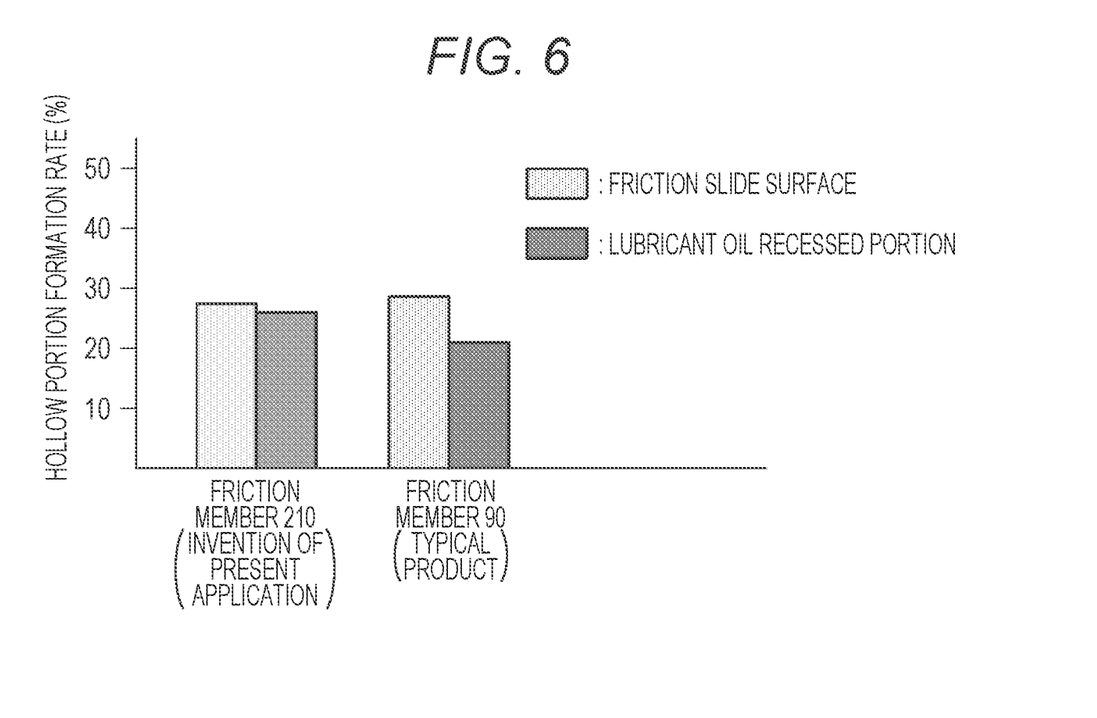
FIG. 6 is a bar graph showing, for each of the friction slide surface and the lubricant oil recessed portion, a formation rate of a hollow portion in the friction member illustrated in FIGS. 5(A) and 5(B) and a formation rate of a hollow portion in a friction member according to the prior art.

Verification results obtained by the inventor(s) of the present invention will be described herein. FIG. 6 is, for the friction member 210 according to the invention of the present application and a friction member 90 according to the prior art, a bar graph of the cumulative value of the area of the hollow portions 212 obtained by the image processing by binarization. The horizontal axis represents the total area of the hollow portions 212 for each of the friction slide surface 213 and the lubricant oil recessed portion 214 in the friction member 210 and the total area of hollow portions 92 for each of a friction slide surface 93 and a lubricant oil recessed portion 94 in the friction member 90. Moreover, the vertical axis represents the rate of the total area of the hollow portions 212 to the entire area of each of the trimming frames TF1, TF2.

Figure 7:
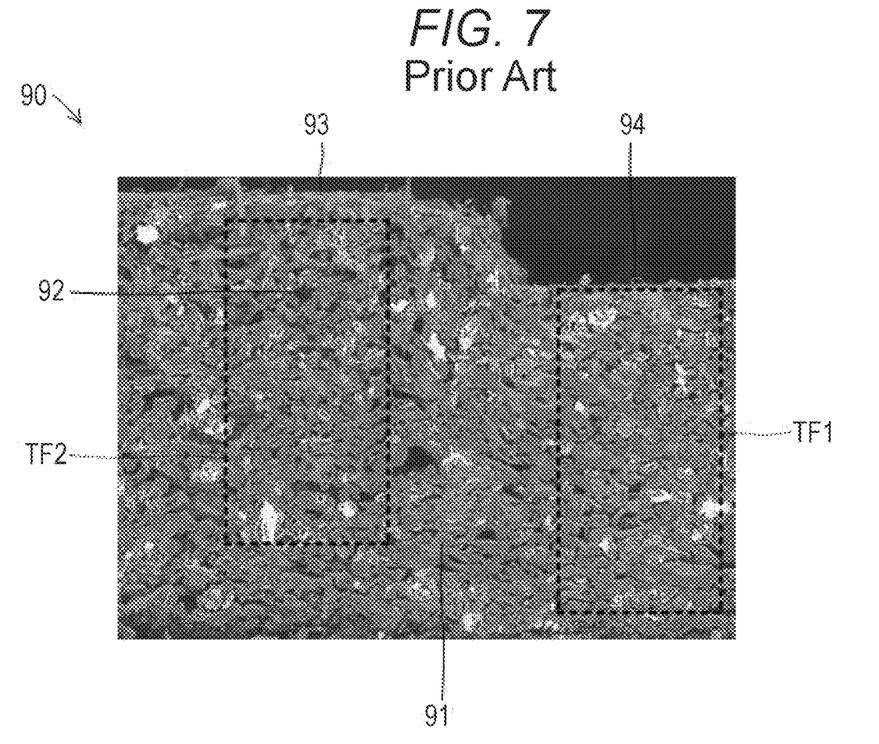
FIG. 7 is image data obtained in such a manner that an image of the cross section of the friction member according to the prior art is captured by the scanning electron microscope.

As illustrated in FIG. 7, the lubricant oil recessed portion 94 in a recessed shape is formed at the friction member 90 in such a manner that a die is pressed against a surface of a porous layer 91 having the same quality as that of the porous layer 211. In this case, at the lubricant oil recessed portion 94, a corner portion with an angle of about 120° is formed at each end portion of a bottom portion in a cross-sectional direction. Note that FIG. 7 shows an image of only one (the left side as viewed in the figure) of two corner portions. The non-imaged other corner portion is formed at a right end portion of this image as viewed in the figure.

Figure 8:
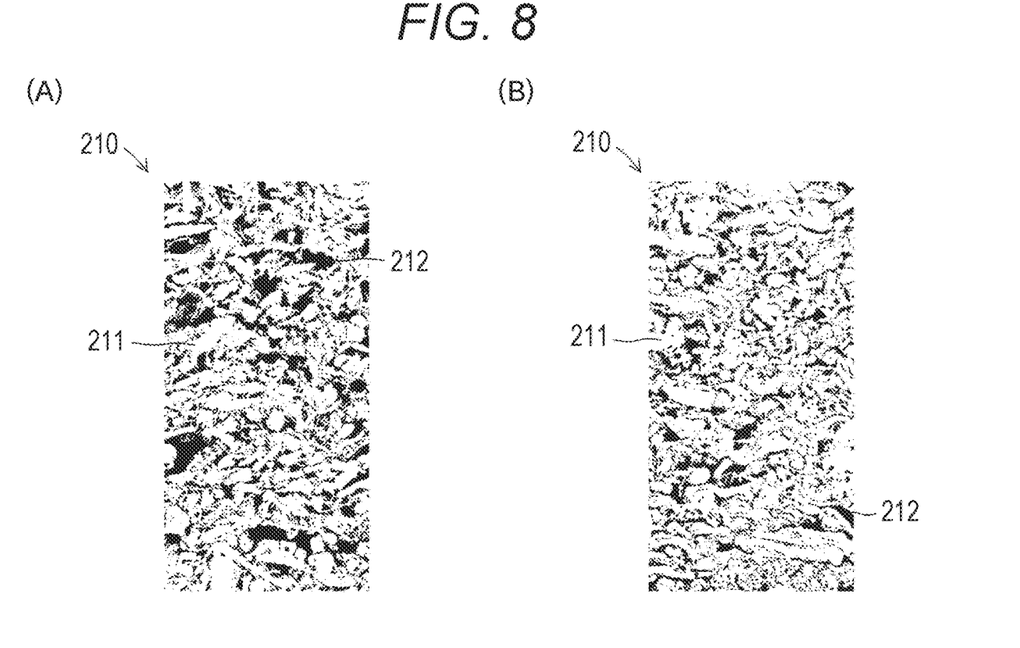
FIGS. 8(A) and 8(B) are image data obtained in such a manner that image data trimmed from the image data illustrated in FIG. 7 within trimming frames TF1, TF2 is binarized, FIG. 8(A) illustrating a porous layer right below a friction slide surface and FIG. 8(B) illustrating a porous layer right below a lubricant oil recessed portion.

For the friction member 90, the inventor(s) of the present invention has acquired image data by imaging of the porous layer 91 in a manner similar to that for the friction member 210. Thereafter, as illustrated in FIGS. 8(A) and 8(B), the acquired image data is trimmed within trimming frames TF1, TF2 and is binarized. Then, the inventor(s) of the present invention calculates, in a manner similar to that described above, the cumulative total of the area of a portion (a black portion) equivalent to the hollow portions 92 in the binarized image data. Note that from the image data illustrated in FIGS. 7, 8(A) and 8(B), it can be also confirmed that the porous layer 91 as a support layer forming the lubricant oil recessed portion 94 is more compressed and crushed in the upper-lower direction as viewed in the figure than the porous layer 91 as a support layer forming the friction slide surface 93 in the friction member 90.

According to the verification results obtained by the inventor(s) of the present invention, the formation rate of the hollow portion 212 right below the friction slide surface 213 in the friction member 210 is 27.4%. The formation rate of the hollow portion 212 right below the lubricant oil recessed portion 214 is 26.1%. Moreover, the formation rate of the hollow portion 92 right below the friction slide surface 93 in the friction member 90 is 28.8%. The formation rate of the hollow portion 92 right below the lubricant oil recessed portion 94 is 21.2%. Note that each of these formation rates is the average of multiple samples.

(Manufacturing of Wet Friction Plate 200)

Next, the method for manufacturing the wet friction plate 200 configured as described above will be described with reference to FIGS. 9 and 10. First, the worker performs the raw material mixing step of mixing a raw material. Specifically, the worker injects the raw material of the paper base material, i.e., the organic fibers and/or the inorganic fibers, the filler, and a flocculant, into water in a mixing tank 300, and thereafter, mixes such a material to generate the raw material in the form of slurry. Subsequently, the worker transfers the slurry of the raw material in the mixing tank 300 to a papermaking tank 301 by means of a pump 300a.

Figure 9:
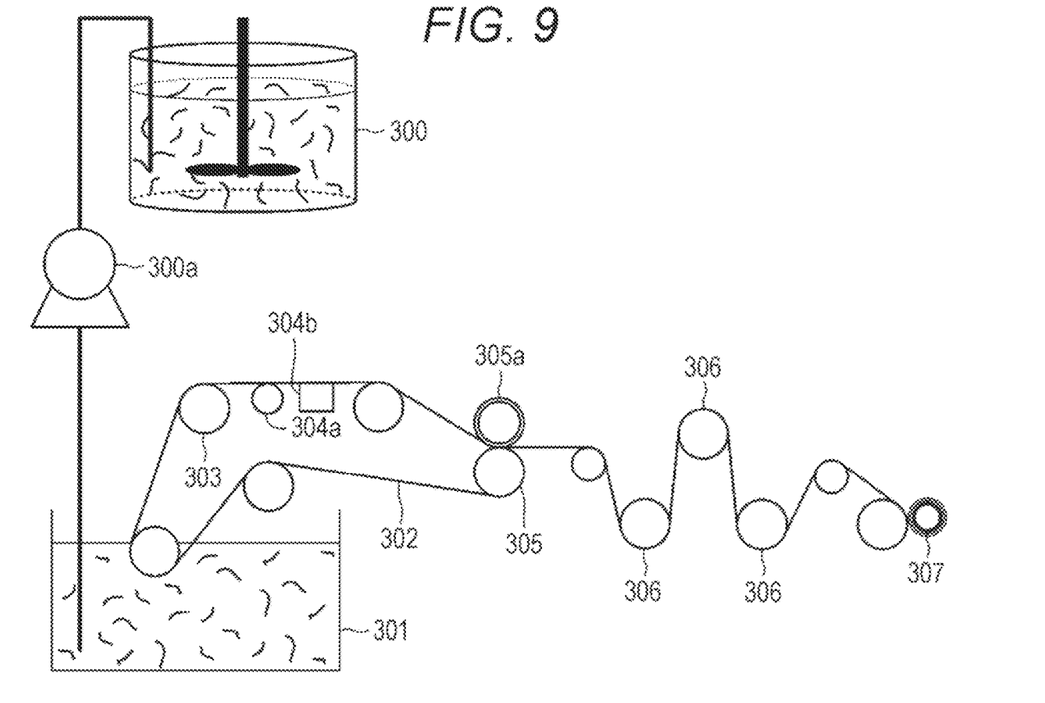
FIG. 9 is a schematic view for describing the main steps of manufacturing the wet friction plate and the friction member illustrated in FIG. 2.

Next, the worker performs a papermaking step. The papermaking step mainly includes an original shape formation step, a water content adjustment step, a lubricant oil recessed portion formation step, and a drying step. Specifically, the worker rotatably drives a delivery device 303 including an endless belt-shaped papermaking net 302 arranged facing the inside of the papermaking tank 301. Then, the worker delivers the raw material filtered in the form of a sheet from the inside of the papermaking tank 301 to a pair of press rollers 305 (the original shape formation step). The delivery device 303 includes, among the papermaking tank 301 and the press rollers 305, a water absorbing roller 304a and a suction box 304b. With this configuration, moisture is removed from the sheet-shaped raw material on the papermaking net 302 (the water content adjustment step).

Figure 10:
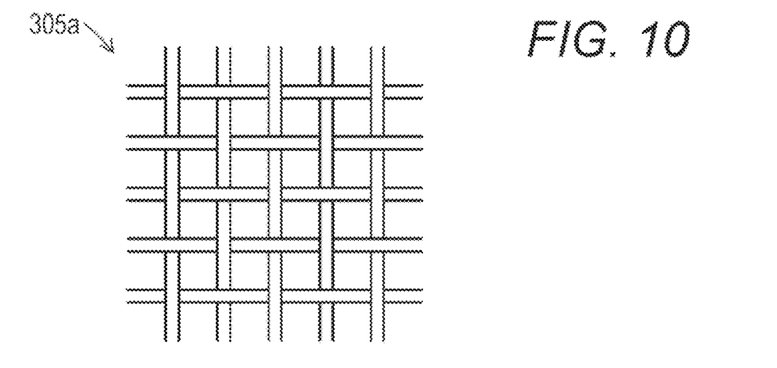
FIG. 10 is a schematic partially-enlarged view of an external configuration of a lubricant oil recessed portion molding die attached to press rollers illustrated in FIG. 9.

The press rollers 305 are components configured to form the lubricant oil recessed portions 214 at the sheet-shaped raw material on the papermaking net 302. The press rollers 305 include a pair of rollers arranged facing each other. In this case, a lubricant oil recessed portion molding die 305a formed of metal or resin threads woven in a grid shape as illustrated in FIG. 10 is wound around a surface of one of two rollers forming the press rollers 305. The press rollers 305 are provided such that the water content (% by weight) of the sheet-shaped raw material on the path of the papermaking net 302 falls within a range of 90% to 50%. In the present embodiment, the press rollers 305 are provided such that the water content (% by weight) of the sheet-shaped raw material on the path of the papermaking net 302 falls within a range of 60% to 50%.

Thus, after having drawn up from the papermaking tank 301, the sheet-shaped raw material adjusted to have a predetermined water content passes through the press rollers 305. In this manner, the friction slide surface 213 and the lubricant oil recessed portions 214 are formed at the surface facing the lubricant oil recessed portion molding die 305a (the lubricant oil recessed portion formation step). In this case, the sheet-shaped raw material is adjusted to have a relatively-high water content. In addition, the lubricant oil recessed portion molding die 305a is formed with a smooth curved surface. This reduces the absence of the hollow portions 212 due to compression deformation of a portion of the friction member 210 pressed against the lubricant oil recessed portion molding die 305a. Thus, a difference in the formation rate of the hollow portion 212 in the porous layer 211 between the friction slide surface 213 and the lubricant oil recessed portion 214 can be reduced. Note that according to experiment by the inventor(s) of the present invention, the lubricant oil recessed portion molding die 305a includes the woven resin threads, and therefore, flexibility can be more easily ensured as compared to the case of including the metal threads. Moreover, compression deformation of the porous layer 211 right below the lubricant oil recessed portion 214 can be reduced.

Subsequently, the sheet-shaped raw material at which the friction slide surface 213 and the lubricant oil recessed portions 214 are formed passe through a drying device 306 including a drying roller arranged on a downstream side of the press rollers 305. In this manner, the water content is further decreased to 10% or lower (the drying step). In this case, the water content of the sheet-shaped raw material at which the friction slide surface 213 and the lubricant oil recessed portions 214 are formed is preferably equal to or higher than 3%. Thereafter, the sheet-shaped raw material is rolled up by a recovery roller 307, and the papermaking step ends.

Next, the worker performs a hardening step. Specifically, the worker impregnates, with the thermosetting resin, the sheet-shaped raw material dried until the water content reaches 10% or lower. Thereafter, the worker hardens the sheet-shaped raw material while heating the sheet-shaped raw material and pressing and shaping the sheet-shaped raw material. In this manner, the worker can manufacture the friction member 210 including the porous layer 211 hardened in a state in which the friction slide surface 213 and the lubricant oil recessed portions 214 are formed.

Next, the worker performs the step of bonding the friction members 210. Specifically, the worker bonds, with an adhesive, small pieces of the friction members 210 to the surface of the core metal 201 produced by machining such as pressing at another step along the circumferential direction. In this case, the worker may bond the friction members 210 cut in a small piece shape in advance to the core metal 201. Alternatively, the worker can cut the friction member 210 in a small piece shape when bonding the friction member 210 to the core metal 201. In this manner, the worker can manufacture the wet friction plate 200 configured such that the small piece-shaped friction members 210 are bonded to both surfaces of the core metal 201 along the circumferential direction through the oil grooves 203. Note that the steps of manufacturing the wet friction plate 200 may include, for example, machining steps other than above and the steps of adjusting and examining friction characteristics. Note that these steps do not directly relate to the present invention, and therefore, description thereof will be omitted.

(Actuation of Wet Friction Plate 200)

Next, actuation of the wet friction plate 200 configured as described above will be described. As described above, the wet friction plates 200 are, upon use, assembled in the wet multiplate clutch device 100. The wet multiplate clutch device 100 is arranged between the engine and the transmission of the vehicle as described above. By operation of the clutch operation lever by a driver of the vehicle, the wet multiplate clutch device 100 transmits the drive force of the engine to the transmission, or blocks such transmission.

That is, in a case where the driver (not shown) of the vehicle operates the clutch operation lever (not shown) to retreat (displace to the left side as viewed in the figure) the push rod 106, the tip end portion of the push rod 106 does not press the release bearing 107a. Thus, the pressing cover 107 presses the clutch plates 103 by elastic force of the coil spring 108c. Accordingly, the clutch plates 103 and the wet friction plates 200 are in a friction-coupled state. In this state, all plates are pressed against the outer peripheral surface of the friction plate holder 104 while displacing toward a receiving portion 104b formed in a flange shape. As a result, the drive force of the engine transmitted to the input gear 102 is transmitted to the transmission through the clutch plates 103, the wet friction plates 200, the friction plate holder 104, and the shaft 105.

On the other hand, in a case where the driver of the vehicle operates the clutch operation lever (not shown) to advance (displace to the right side as viewed in the figure) the push rod 106, the tip end portion of the push rod 106 presses the release bearing 107a. Thus, the pressing cover 107 displaces to the right side as viewed in the figure against the elastic force of the coil spring 108c. Then, the pressing cover 107 and the clutch plates 103 are separated from each other. Accordingly, the clutch plates 103 and the wet friction plates 200 displace to a pressing cover 107 side, and the state in which all plates are pressed against each other and coupled to each other is cancelled. Thus, all plates are separated from each other. As a result, the drive force is no longer transmitted from the clutch plates 103 to the wet friction plates 200. As a result, transmission of the drive force, which is transmitted to the input gear 102, of the engine to the transmission is blocked.

In this state in which the clutch plates 103 and the wet friction plates 200 friction-contact each other, the lubricant oil present on the surfaces of the friction members 210 of the wet friction plates 200 is pushed by the clutch plates 103. Then, part of the lubricant oil is discharged to the outside of the friction members 210 through outer edge portions thereof. In addition, another part of the lubricant oil penetrates the friction members 210. In this case, the lubricant oil penetrating the friction members 210 includes lubricant oil held in the lubricant oil recessed portions 214 and lubricant oil penetrating the porous layers 211. Part of the lubricant oil penetrating the porous layers 211 is discharged from end surfaces of the porous layers 211 (the friction members 210) through the hollow portions 212. In addition, another part of the lubricant oil remains in the hollow portions 212.

In this case, there are no sharp portions in the pointed shape, such as the corner portions, at the surfaces of the lubricant oil recessed portions 214 holding the lubricant oil. That is, these surfaces are formed with the smooth continuous surfaces. In addition, the above-described surfaces are formed such that the formation rate of the hollow portion 212 in the porous layer 211 forming the lubricant oil recessed portion 214 and the formation rate of the hollow portion 212 in the porous layer 211 forming the friction slide surface 213 are the same as each other. With this configuration, a difference in lubricant oil penetration and discharge performance of the porous layer 211 is small between the friction slide surface 213 and the lubricant oil recessed portion 214 in the wet multiplate clutch device 100. Thus, the performance for discharging the lubricant oil adhering to the surface of the friction member 210 is improved. Moreover, temperature characteristics (cooling characteristics) and surface pressure characteristics can be stabilized. As a result, the durability of the friction member 210 can be improved.

In the wet multiplate clutch device 100, when the clutch plates 103 and the wet friction plates 200 are separated from each other, the amount of lubricant oil remaining among the clutch plates 103 and the wet friction plates 200 is less than that in the prior art. Thus, the wet multiplate clutch device 100 can reduce a state in which the clutch plates 103 and the wet friction plates 200 are indirectly connected to each other due to the lubricant oil present among these plates, i.e., drag torque, upon clutch-OFF.

As can be understood from description of actuation above, according to the above-described embodiment, there are no sharp portions in the pointed shape, such as the corner portions, at the surface of the lubricant oil recessed portion 214 of the wet friction plate 200. That is, such a surface is formed with the smooth continuous surface. In addition, the above-described surface is formed such that the formation rate of the hollow portion 212 in the porous layer 211 forming the lubricant oil recessed portion 214 and the formation rate of the hollow portion 212 in the porous layer 211 forming the friction slide surface 213 are the same as each other. Thus, the lubricant oil penetration and discharge performance of the porous layer 211 is the same between the friction slide surface 213 and the lubricant oil recessed portion 214. Thus, the performance for discharging the lubricant oil adhering to the surface of the friction member 210 can be improved.

Further, implementation of the present invention is not limited to the above-described embodiment, and various changes can be made without departing from the object of the present invention. Note that in each variation described below, reference numerals corresponding to those assigned to the wet friction plate 200 are used to represent components similar to those of the wet friction plate 200 in the above-described embodiment. Moreover, description thereof will be omitted.

For example, in the above-described embodiment, the wet friction plates 200 are held by the friction plate holder 104 to be rotatably driven integrally with the shaft 105. That is, the wet friction plate 200 is applied as an opposing plate arranged facing the clutch plate 103 to be rotatably driven by the rotary drive force of the engine and rotatably driven integrally with the shaft 105 as an output shaft in the wet multiplate clutch device 100. However, the wet friction plate 200 can be also applied to the clutch plate 103 as a drive plate to be rotatably driven by the rotary drive force of the engine.

Moreover, in the above-described embodiment, the lubricant oil recessed portion 214 is formed such that the cross-sectional shape thereof is a single arc shape. However, it may only be required that the surface of the lubricant oil recessed portion 214 has no sharp portions in the pointed shape, such as the corner portions, and is formed with the smooth continuous surface. Thus, the lubricant oil recessed portion 214 may include a linear portion as included in the longitudinal section of the lubricant oil recessed portion 214. Alternatively, the lubricant oil recessed portion 214 may be formed to have a curved surface with two or more curves.

Figure 11:
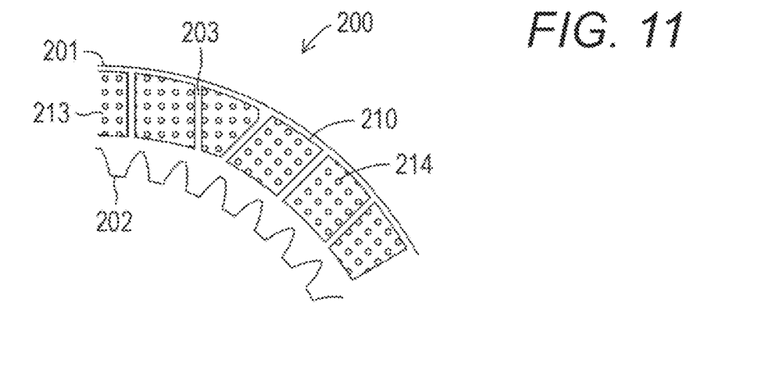
FIG. 11 is a partial plan view of an external configuration of a wet friction plate according to a variation of the present invention.
Figure 12:
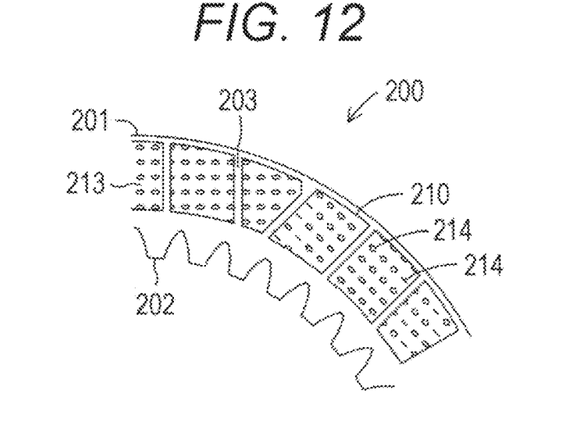
FIG. 12 is a partial plan view of an external configuration of a wet friction plate according to another variation of the present invention.
Figure 13:
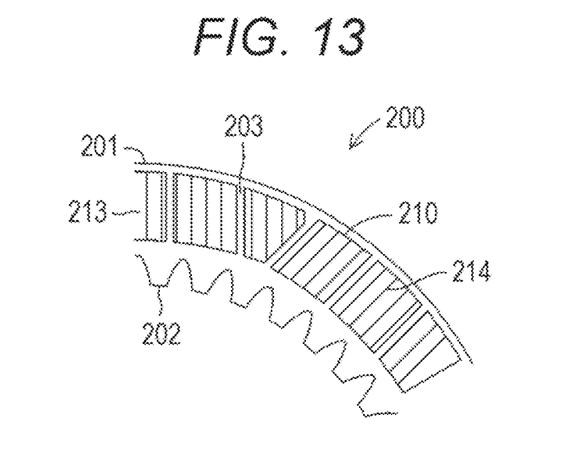
FIG. 13 is a partial plan view of an external configuration of a wet friction plate according to still another variation of the present invention.
Figure 14:
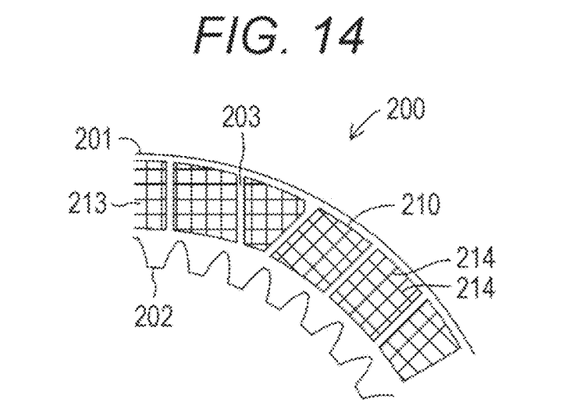
FIG. 14 is a partial plan view of an external configuration of a wet friction plate according to still another variation of the present invention.

Further, in the above-described embodiment, the lubricant oil recessed portion 214 is formed in the long hole shape as viewed in plane. However, it may only be required that the surface of the lubricant oil recessed portion 214 has no sharp portions in the pointed shape, such as the corner portions, and is formed with the smooth continuous surface. Thus, as illustrated in FIG. 11, the lubricant oil recessed portion 214 can be formed in a dimple shape recessed in a hemispherical shape. Alternatively, the lubricant oil recessed portion 214 can be formed in an oval shape. As illustrated in FIG. 12, the lubricant oil recessed portions 214 can be formed in shapes including the long hole shape and the oval shape. Alternatively, as illustrated in FIG. 13, the lubricant oil recessed portion 214 can be formed to linearly extend in a radial direction of the core metal 201 and penetrate the friction member 210. Alternatively, the lubricant oil recessed portion 214 can be formed to extend in the circumferential direction and a tangential direction instead of or in addition to the radial direction of the core metal 201. Alternatively, as illustrated in FIG. 14, the lubricant oil recessed portions 214 can be formed to extend in a grid shape or a mesh shape in two directions crossing each other. Alternatively, the lubricant oil recessed portion 214 can be formed in a curved shape instead of or in addition to the linear shape as viewed in the plane.

In addition, in the above-described embodiment, the lubricant oil recessed portions 214 are formed to have the multiple types of sizes including the multiple types of lengths in the longitudinal direction, lengths in the width direction, and depths. However, all of the lubricant oil recessed portions 214 can be formed in the same shapes.

Moreover, at the original shape formation step of the above-described embodiment, the endless belt-shaped papermaking net 302 is used to form the raw material in the sheet shape extending in a band shape. However, it may only be required that the papermaking net 302 forms the raw material in the sheet shape. Thus, the papermaking net 302 may be formed in a quadrangular shape or a circular shape. In this case, the papermaking net 302 formed in the quadrangular shape or the circular shape can be housed in a bottomed tubular molding die, and can form the raw material in a quadrangular or circular sheet shape.

Further, in the above-described embodiment, the water content of the sheet-shaped raw material is adjusted to equal to or lower than 60% and equal to or higher than 50% at the water content adjustment step. However, it may only be required that at the water content adjustment step, the water content of the sheet-shaped raw material is adjusted to equal to or lower than 90% and equal to or higher than 50%. Preferably, such a water content is adjusted to equal to or lower than 70% and equal to or higher than 50%. With this configuration, the lubricant oil recessed portion 214 can be easily formed with high accuracy.

In addition, in the above-described embodiment, at the lubricant oil recessed portion formation step, the lubricant oil recessed portions 214 are formed by the lubricant oil recessed portion molding die 305a formed in a roll shape. However, at the lubricant oil recessed portion formation step, the planar lubricant oil recessed portion molding die 305a can be pressed against the raw material to form the lubricant oil recessed portions 214.

Moreover, in the above-described embodiment, the lubricant oil recessed portion molding die 305a includes the resin threads woven in the grid shape. However, it may only be required that the lubricant oil recessed portion molding die 305a forms the lubricant oil recessed portions 214 on the raw material. Thus, the lubricant oil recessed portion molding die 305a may be made of a resin material or a metal material formed in a grid shape by processing such as injection molding. Alternatively, the lubricant oil recessed portion molding die 305a can be formed of a resin or metal plate-shaped body having multiple recessed-raised portions or through-holes formed for formation of the lubricant oil recessed portions 214.

Further, in the above-described embodiment, the example where the wet friction plate according to the present invention is applied as the wet friction plate 200 used for the wet multiplate clutch device 100 has been described. However, it may be only required that the wet friction plate according to the present invention is a wet friction plate used in oil. In addition to the wet multiplate clutch device 100, the wet friction plate according to the present invention can be applied as a wet friction plate used for a brake device configured to put a brake on rotary motion by the motor.

LIST OF REFERENCE SIGNS

TF1 Trimming frame for acquiring image data of portion right below lubricant oil recessed portion
TF2 Trimming frame for acquiring image data of portion right below friction slide surface
90 Typical friction member
91 Porous layer
92 Hollow portion
93 Friction slide surface
94 Lubricant oil recessed portion
100 Wet multiplate clutch device
101 Housing
102 Input gear
102a Torque damper
102b Rivet
103 Clutch plate
104 Friction plate holder
104a Tubular support rod
105 Shaft
105a Needle bearing
105b Nut
106 Push rod
107 Pressing cover
107a Release bearing
108a Bolt
108b Receiving plate
108c Coil spring
200 Wet friction plate
201 Core metal
202 Spline
203 Oil groove
210 Friction member
211 Porous layer
212 Hollow portion
213 Friction slide surface
214 Lubricant oil recessed portion
300 Mixing tank
300a Pump
301 Papermaking tank
302 Papermaking net
303 Delivery device
304a Water absorbing roller
304b Suction box
305 Press roller
305a Lubricant oil recessed portion molding die
306 Drying device
307 Recovery roller

The invention claimed is:

1. A wet friction plate comprising:
a friction member including a friction slide surface and multiple lubricant oil recessed portions depressed in a recessed shape with respect to the friction slide surface, the friction slide surface and the lubricant oil recessed portions being formed at a surface of a porous layer having multiple hollow portions; and
a core metal formed in a flat plate annular shape and provided with the friction member along a circumferential direction,
wherein:
the friction member is configured such that
a surface of each lubricant oil recessed portion has no sharp portion in a pointed shape including a corner portion, and formed with a smooth continuous surface and
a formation rate of the hollow portions in the porous layer forming the lubricant oil recessed portions and a formation rate of the hollow portions in the porous layer forming the friction slide surface are identical to each other;
each lubricant oil recessed portion is formed, to be linearly extend, into a long hole shape or an oval shape as viewed in plane;
adjacent ones of the lubricant oil recessed portions are formed in directions perpendicular to each other,
the lubricant oil recessed portions include a first lubricant oil recessed portion and a second lubricant oil recessed portion each formed, to be linearly extend, into the long hole shape as viewed in plane,
a longitudinal direction of the first lubricant oil recessed portion extends along the circumferential direction of the core metal, and a longitudinal direction of the second lubricant oil recessed portion extends radially with respect to a center of the core metal.

2. The wet friction plate according to claim 1, wherein each lubricant oil recessed portion is configured such that at least one of two sections in directions perpendicular to each other as viewed in plane is formed in an arc shape with one curvature.

3. The wet friction plate according to claim 1, wherein the lubricant oil recessed portions are formed with multiple types of depths.

4. A wet multiplate clutch device comprising:
an opposing plate arranged facing a drive plate to be rotatably driven by a motor through a clearance and lubricant oil,
  wherein the opposing plate and the drive plate contact each other or separate from each other to transmit rotary drive force between the opposing plate and the drive plate or block transmission of the rotary drive force, and
at least one of the drive plate or the opposing plate is the wet friction plate according to claim 1.

5. The wet friction plate according to claim 1, wherein the friction slide surface is interposed between the adjacent ones of the lubricant oil recessed portions formed in directions perpendicular to each other.

\* \* \* \* \*